US010626344B2

(12) United States Patent
Saito et al.

(10) Patent No.: US 10,626,344 B2
(45) Date of Patent: Apr. 21, 2020

(54) REFRIGERATING MACHINE OIL, AND WORKING FLUID COMPOSITION FOR REFRIGERATING MACHINES

(71) Applicant: JXTG NIPPON OIL & ENERGY CORPORATION, Tokyo (JP)

(72) Inventors: Masanori Saito, Tokyo (JP); Hiroko Shimpo, Tokyo (JP); Kuniko Adegawa, Tokyo (JP)

(73) Assignee: JXTG NIPPON OIL & ENERGY CORPORATION, Tokyo (JP)

(\*) Notice: Subject to any disclaimer, the term of this patent is extended or adjusted under 35 U.S.C. 154(b) by 80 days.

(21) Appl. No.: 15/918,689

(22) Filed: Mar. 12, 2018

(65) Prior Publication Data

US 2018/0201867 A1 Jul. 19, 2018

Related U.S. Application Data

(63) Continuation of application No. 14/767,409, filed as application No. PCT/JP2014/050161 on Jan. 8, 2014, now Pat. No. 9,944,881.

(30) Foreign Application Priority Data

Feb. 26, 2013 (JP) .................. 2013-036452

(51) Int. Cl.
*C09K 5/04* (2006.01)
*C10M 169/04* (2006.01)
*C10M 171/00* (2006.01)

(52) U.S. Cl.
CPC ........... *C10M 169/04* (2013.01); *C09K 5/042* (2013.01); *C09K 5/045* (2013.01); *C10M 171/008* (2013.01); *C09K 2205/12* (2013.01); *C09K 2205/122* (2013.01); *C09K 2205/126* (2013.01); *C09K 2205/22* (2013.01); *C10M 2203/1025* (2013.01); *C10M 2207/283* (2013.01); *C10M 2207/2835* (2013.01); *C10M 2209/043* (2013.01); *C10M 2209/1055* (2013.01); *C10M 2219/082* (2013.01); *C10M 2219/083* (2013.01); *C10M 2219/087* (2013.01); *C10M 2223/04* (2013.01); *C10M 2223/041* (2013.01); *C10N 2220/022* (2013.01); *C10N 2220/302* (2013.01); *C10N 2220/303* (2013.01); *C10N 2230/02* (2013.01); *C10N 2230/06* (2013.01); *C10N 2230/70* (2013.01)

(58) Field of Classification Search
CPC ...... C10M 171/008; C10M 2207/2835; C10M 105/38; C10M 2207/283; C10M 2223/04; C10M 2219/08; C09K 5/045; C09K 2205/22

See application file for complete search history.

(56) References Cited

U.S. PATENT DOCUMENTS

| 5,716,916 A * | 2/1998 | Shiokawa ............... C09K 5/045 252/68 |
| 5,741,763 A | 4/1998 | Matsushita et al. |
| 6,221,274 B1 * | 4/2001 | Akahori ................. C09K 5/045 252/68 |
| 6,667,285 B1 * | 12/2003 | Kawahara .............. C09K 5/045 252/68 |
| 2002/0193262 A1 * | 12/2002 | Kaimai .................. C09K 5/045 508/485 |
| 2003/0087769 A1 * | 5/2003 | Dituro .................. C10M 161/00 508/185 |
| 2010/0190672 A1 * | 7/2010 | Carr .................... C10M 171/008 508/485 |
| 2012/0220508 A1 * | 8/2012 | Rinklieb ............... C10M 169/04 508/346 |
| 2013/0207023 A1 * | 8/2013 | Benanti .................. C09K 5/045 252/68 |
| 2015/0018257 A1 * | 1/2015 | Aoki .................... C10M 133/16 508/437 |
| 2015/0203781 A1 * | 7/2015 | Matsui ................ C10M 145/14 508/463 |
| 2015/0300698 A1 * | 10/2015 | Tanaka ................. C09K 5/045 62/498 |

FOREIGN PATENT DOCUMENTS

| CN | 1205029 A | 1/1999 |
| CN | 104903431 A | 9/2015 |
| EP | 2818537 A1 | 12/2014 |
| EP | 2930230 A1 | 10/2015 |
| EP | 2947136 A1 | 11/2015 |
| JP | S6239695 A | 2/1987 |
| JP | H05171174 A | 7/1993 |

(Continued)

OTHER PUBLICATIONS

International Search report issued with respect to application No. PCT/JP2014/050161, dated Mar. 18, 2014.
International Preliminary Report on Patentability issued with respect to application No. PCT/JP2014/050161, dated Sep. 11, 2015.
European search report issued with respect to application No. 14756995.8, dated Feb. 24, 2016.
"Database WPI Week 200173", Thomson Scientific, London, GB, AN2001-630502, 2001, XP002753969.

(Continued)

*Primary Examiner* — John R Hardee

(74) *Attorney, Agent, or Firm* — Greenblum & Bernstein, P.L.C.

(57) ABSTRACT

The present invention provides a refrigerating machine oil comprising a base oil; a sulfide compound; and an orthophosphoric acid ester, wherein a content of the sulfide compound is 0.01 to 2.0% by mass and a content of the orthophosphoric acid ester is 0.1 to 5.0% by mass, based on a total amount of the refrigerating machine oil, and the refrigerating machine oil having a kinematic viscosity at 40° C. of 3 to 500 mm$^2$/s.

7 Claims, No Drawings

(56) References Cited

FOREIGN PATENT DOCUMENTS

| | | |
|---|---|---|
| JP | H5230487 A | 9/1993 |
| JP | H08157847 A | 6/1996 |
| JP | H09189453 A | 7/1997 |
| JP | H9316479 A | 12/1997 |
| JP | 2001-226690 A | 8/2001 |
| JP | 5689428 A | 2/2015 |
| WO | 00/060021 A | 10/2000 |
| WO | 2012026303 A | 3/2012 |
| WO | 2013/125528 A | 8/2013 |

OTHER PUBLICATIONS

Japanese Office Action issued with respect to application No. P2015-502794, dated Aug. 30, 2016.
Taiwanese Office Action issued with respect to application No. 103101499, dated Jan. 23, 2017.
Chinese Office Action in respect to Chinese Office Action 201480010584.9, dated Apr. 25, 2017.
Japanese Notice of Allowance in respect to Japanese Application No. P2015-502794, dated Jun. 20, 2017.

\* cited by examiner

REFRIGERATING MACHINE OIL, AND WORKING FLUID COMPOSITION FOR REFRIGERATING MACHINES

The present application is a Continuation Application of U.S. application Ser. No. 14/767,409, now U.S. Pat. No. 9,944,881, filed Aug. 12, 2015, which is a National Stage of International Patent Application No. PCT/JP2014/050161 filed Jan. 8, 2014, which claims priority to Japanese Application No. 2013-036452 filed Feb. 26, 2013. The disclosures of U.S. application Ser. No. 14/767,409 and International Patent Application No. PCT/JP2014/050161 are incorporated by reference herein in their entireties.

TECHNICAL FIELD

The present invention relates to a working fluid composition for a refrigerating machine. The "refrigerating machine" as used herein includes air conditioners for automobiles, dehumidifiers, refrigerators, freezing-refrigerating warehouses, vending machines, showcases, cooling apparatus for chemical plants or the like, air conditioners for housing, package air conditioners and heat pumps for supplying hot water.

BACKGROUND ART

Currently, as a refrigerant for refrigerators, car air conditioners, room air conditioners, industrial refrigerating machines or the like are widely used 1,1,1,2-tetrafluoroethane (R134a), which is one of hydrofluorocarbons (HFC), an R410A which is a mixed refrigerant of difluoromethane (R32) and pentafluoroethane (R125) in a mass ratio of 1/1 and the like. However, the use of these HFC refrigerants is regulated by the so-called F-gas Regulation, the purpose of which is to protect the global environment, because they have a high global warming potential (GWP) of 1000 or more although their ozone-depleting potential (ODP) is zero.

As a substitute candidate for a refrigerant with a high GWP, single 2,3,3,3-tetrafluoropropene (HFO-1234yf) or difluoromethane (R32) is studied because of the thermodynamic properties. In addition, these refrigerants and a mixed refrigerant of them with other refrigerants which have balanced properties with GWP are also studied. It is essential for the substitute for a HFC refrigerant to have a low GWP and HFO-1234yf has a low GWP of 4. R32 has a slightly high GWP of 675, however it is studied as a potential candidate because it has a high gas pressure and is a highly efficient refrigerant.

Further, hydrocarbon refrigerants such as isobutane (R600a) and propane (R290), which are practically used for refrigerators, have a low GWP of 20 or less and proper physical properties, and therefore are studied although their combustibility, and carbon dioxide (R744), which has a GWP of 1 (standard), is studied as a single refrigerant or a refrigerant to be mixed for the purpose of fireproofing.

When these refrigerants are used, the working fluid in which a refrigerant and a refrigerating machine oil are mixed together is required to have a higher wear resistance than that of the conventional one because of severe lubrication conditions.

In general, as a wear-resistant additive to improve the lubricity of a lubricating oil are known oily agents such as alcohols, esters and long-chain fatty acids, wear-resistant agents such as phosphates, metal dithiophosphates, and extreme-pressure agents such as organic sulfur compounds and organic halogen compounds. In the case of a refrigerating machine oil, alcohol-based or ester-based oily agents or triphenyl phosphate or tricresyl phosphate among phosphates are used because they do not precipitate even when coexisting with a refrigerant and only an additive which does not adversely affect stability can be used.

Furthermore, Patent Literature 1 suggests a lubricating oil including one for refrigerating machine in which a phosphorus-based additive and a specific epoxy compound are added in combination, Patent Literature 2 suggests a lubricating oil for a compressor in which a triphenyl phosphate and a tri(alkylphenyl) phosphate are added in combination for a HFC refrigerant, and Patent Literature 3 suggests a refrigerating machine oil in which a tricresyl phosphate and an epoxy consisting of a glycidyl ether or a carbodiimide are added for a HFC refrigerant.

However, oily agents among these additives form a lubricating film by adsorption, and therefore the friction coefficient can be maintained low in the case of relatively mild loading conditions such as a mixed lubricating area, however the antiwear effect is lost in the case of severe loading conditions. On the other hand, triphenyl phosphate and tricresyl phosphate have an insufficient wear resistance under severe lubrication conditions in which a refrigerant with a low GWP coexists although they have a certain degree of a wear resistance effect.

Because of these facts, a refrigerating machine oil with a higher wear resistance is demanded and a working fluid with a high wear resistance in which a refrigerant is mixed is required in a freezing/air conditioning system.

CITATION LIST

Patent Literature

[Patent Literature 1] Japanese Patent Application Laid-Open No. 5-171174
[Patent Literature 2] Japanese Patent Application Laid-Open No. 8-157847
[Patent Literature 3] Japanese Patent Application Laid-Open No. 9-189453

SUMMARY OF INVENTION

Technical Problem

The present invention was made in view of the above problems, and it is the object of the present invention to provide a refrigerating machine oil and working fluid composition having a high antiwear effect and being excellent in long-term reliability even under severe lubrication conditions in which a low-GWP refrigerant coexists.

Solution to Problem

The present inventors found that a refrigerating machine oil in which a sulfide compound and an orthophosphoric acid ester are blended in a base oil and a working fluid for freezing/air-conditioning comprising a low-GWP refrigerant can significantly improve the wear resistance of a refrigerating machine oil without any adverse effect on other properties, and the present invention was completed.

That is, the present invention provides a working fluid composition for a refrigerating machine according to the following [1] to [8].

[1] A refrigerating machine oil comprising: a base oil; a sulfide compound; and an orthophosphoric acid ester, wherein a content of the sulfide compound is 0.01 to 2.0% by mass and a content of the orthophosphoric acid ester is 0.1 to 5.0% by mass, based on a total amount of the refrigerating machine oil, and the refrigerating machine oil having a kinematic viscosity at 40° C. of 3 to 500 mm$^2$/s.

[2] The refrigerating machine oil according to [1], wherein the base oil is at least one selected from the group consisting of an ester with a carbon/oxygen molar ratio of 2.5 or more and 5.8 or less and an ether with a carbon/oxygen molar ratio of 2.5 or more and 5.8 or less; and the kinematic viscosity of the refrigerating machine oil at 40° C. is 3 to 300 mm$^2$/s.

[3] The refrigerating machine oil according to [1] or [2], wherein the base oil is at least one selected from the group consisting of a polyol ester obtainable by synthesis from a fatty acid with 4 or more and 9 or less carbon atoms and a polyhydric alcohol with 4 or more and 12 or less carbon atoms, a polyalkylene glycol, a compound obtainable by etherifying hydroxyl groups at both ends of a polyalkylene glycol, and a polyvinyl ether.

[4] The refrigerating machine oil according to any one of [1] to [3], wherein the sulfide compound is a thiobisphenol compound and the orthophosphoric acid ester is at least one selected from the group consisting of triphenyl phosphate, tricresyl phosphate, and an alkylphenyl phosphate having a C3-C4 alkyl group.

[5] The refrigerating machine oil according to any one of [1] to [4] further comprising 2 to 20% by mass of pentaerythritol tetra(2-ethylhexanoate) based on the total amount of the refrigerating machine oil.

[6] A working fluid composition for a refrigerating machine comprising: a refrigerant with a global warming potential of 700 or less; and the refrigerating machine oil according to any one of [1] to [5].

[7] The working fluid composition for a refrigerating machine according to [6], wherein the refrigerant is a refrigerant comprising at least one selected from the group consisting of a hydrofluorocarbon, a hydrofluoroolefin, carbon dioxide and a hydrocarbon with 2 to 4 carbon atoms.

[8] The working fluid composition for a refrigerating machine according to [6] or [7], wherein the refrigerant is a refrigerant comprising at least one selected from the group consisting of difluoromethane and 2,3,3,3-tetrafluoropropene.

Advantageous Effects of Invention

The refrigerating machine oil and working fluid composition for a refrigerating machine according to the present invention exert a special effect that they have a significant antiwear effect even under severe lubrication conditions in which a low-GWP refrigerant coexists and can be used stably for a long time.

DESCRIPTION OF EMBODIMENTS

The refrigerating machine oil according to the present embodiment is a refrigerating machine oil which contains a base oil and 0.01 to 2.0% by mass of a sulfide compound and 0.1 to 5.0% by mass of an orthophosphoric acid ester based on a total amount of the refrigerating machine oil, and has a kinematic viscosity at 40° C. of 3 to 500 mm$^2$/s.

In the present embodiment, at least one selected from a mineral oil-based base oil and a synthesized oil-based base oil can be used as the base oil. These base oils may be used in a mixture of two or more thereof.

Examples of the mineral oil-based base oil include paraffin-based mineral oils, naphthene-based mineral oils and mixed-base mineral oils, and any of them is a refined lubricating oil fraction obtained by treating the lubricating oil fraction obtained by subjecting a crude oil to atmospheric distillation and further reduced-pressure distillation with means for refining a lubricating oil such as solvent deasphalting, solvent extraction, hydrorefining, hydrocracking, solvent dewaxing, hydrodewaxing and clay treatment in combination appropriately, and can be suitably used. Among them, the solvent extraction, hydrorefining and hydrocracking are processes to control the composition, and the solvent dewaxing and hydrodewaxing to remove the wax component are processes to control low-temperature properties such as a pour point, and the clay treatment is a process to remove the nitrogen component mainly to improve the stability of a base oil. Refined lubricating oil fractions with different characteristics obtained by combining various raw materials with various refining means may be used singly or in combination of two or more.

Examples of the synthesized oil-based base oil include oxygen-containing compounds such as esters and ethers, hydrocarbon oils such as poly-α-olefins (PAO), ethylene-α-olefin oligomers, alkylbenzenes and alkylnaphthalenes.

Among the oxygen-containing compound base oil, esters are compounds having various molecular structures, and are a base oil characterized in they have unique viscosity properties and low-temperature properties respectively and have a higher flash point than that of hydrocarbon-based base oil with the same viscosity. Esters can be obtained by subjecting an alcohol and a fatty acid to dehydration condensation reaction, and in the present embodiment, examples of the suitable base oil component include diesters of a dibasic acid and a monohydric alcohol, polyol esters of a polyol (particularly, a neopentyl polyol) and a monocarboxylic acid, and complex esters of a polyol, a polybasic acid and a monohydric alcohol (or a monocarboxylic acid) from the viewpoint of chemical stability.

In the case that an ester is used as the oxygen-containing compound base oil, it is preferable that the ester have the carbon/oxygen molar ratio of 2.5 or more and 5.8 or less from the viewpoint of compatibility with low-GWP refrigerants (such as R32) which have a high polarity. In addition, more preferred are polyol esters which are synthesized from a linear or branched fatty acid with 4 to 9 carbon atoms and a polyhydric alcohol with 4 to 12 carbon atoms and which are excellent in compatibility with various low-GWP refrigerants.

Specific examples of the linear fatty acid with 4 to 9 carbon atoms include butanoic acid, pentanoic acid, hexanoic acid, heptanoic acid, octanoic acid and nonanoic acid. Specific examples of the branched fatty acid include branched butanoic acids, branched pentanoic acids, branched hexanoic acids, branched heptanoic acids, branched octanoic acids and branched nonanoic acids. More specifically, fatty acids having a branch at the α- and/or β-position are preferable, and isobutanoic acid, 2-methylbutanoic acid, 2-methylpentanoic acid, 2-methyihexanoic acid, 2-ethylpentanoic acid, 2-methyiheptanoic acid, 2-ethylhexanoic acid, 3,5,5-trimethylhexanoic acid and the like are preferable, and among them, 2-ethylhexanoic acid and/or 3,5,5-trimethylhexanoic acid are the most preferable. Note that fatty acids other than the fatty acids with 4 to 9 carbon atoms may be contained.

Polyhydric alcohols with 2 to 6 hydroxy groups are preferable as the polyhydric alcohol. Further, it is preferable that the number of carbon atoms of the polyhydric alcohol be 4 to 12. Specifically hindered alcohols such as neopentyl glycol, trimethylolethane, trimethylolpropane, trimethylolbutane, di-(trimethylolpropane), pentaerythritol and di-(pentaerythritol) are preferable. Pentaerythritol or a mixture ester of pentaerythritol and di-(pentaerythritol) is the most preferable because they are excellent in compatibility with refrigerants and hydrolytic stability.

Examples of the ether include polyalkylene glycols, compounds in which one end or both ends of a polyalkylene glycol is/are etherified and polyvinyl ethers. Examples of the polyalkylene glycol include polypropylene glycols, polyethylene glycols and copolymers of propylene oxide and ethylene oxide. With regard to the end structure, at least one of the ends is preferably an alkyl group, particularly preferably a methyl group, from the viewpoint of hygroscopicity. Further, from the viewpoint of easiness to manufacture and costs, it is preferable that one of the ends be an alkyl group and the other be a hydrogen atom, and especially preferable that one be a methyl group and the other be a hydrogen atom. With regard to the main backbone, a copolymer containing an oxyethylene (EO) group and an oxypropylene (PO) group is preferable from the viewpoint of lubricity, the ratio of oxyethylene groups relative to the total of oxyethylene groups and oxypropylene groups (EO/(PO+EO)) is preferably in a range of 0.1 to 0.8, and more preferably in a range of 0.3 to 0.6. Furthermore, from the viewpoint of hygroscopicity and heat/chemical stability, the value of EO/(PO+EO) is preferably in a range of 0 to 0.5, more preferably in a range of 0 to 0.2, and most preferably 0 (i.e., a homopolymer of propylene oxide).

A polyvinyl ether has a structural unit represented by the following formula (1). The polyvinyl ether in the present embodiment may be a homopolymer whose structural units are identical or a copolymer which is composed of two or more types of structural units, however a copolymer is preferable because it enables to adjust the properties in a balanced manner.

[Chemical Formula 1]

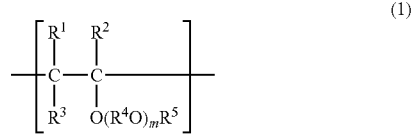

(1)

[$R^1$, $R^2$ and $R^3$ may be identical to or different from each other and each represents a hydrogen atom or a hydrocarbon group; $R^4$ represents a divalent hydrocarbon group or a divalent hydrocarbon group containing an oxygen constituting an ether bond; $R^5$ represents a hydrocarbon group; m represents an integer of 0 or more, and it is preferable that the average value of m be 0 to 10; $R^1$ to $R^5$ may be identical to or different from each other in each structural unit; and when m is 2 or more in one structural unit, a plurality of $R^4O$ may be identical to or different from each other.]

Also with regard to these ethers, more preferable are ethers with a carbon/oxygen molar ratio of 2.5 or more and 5.8 or less, which is excellent in compatibility with low-GWP refrigerants, particularly refrigerants containing R32.

A PAO is widely used among hydrocarbon oils. Because a PAO is a polymer of an α-olefin, the properties can be modulated depending on the degree of polymerization. Alkylbenzenes are used in the field of lubricating oils for a refrigerating machine, and they are classified into a linear type and a branched type on the basis of the structure of the alkyl group and used in a different way depending on the object because they have different properties from each other.

The above mineral oil-based base oil and synthesized oil can be blended in an appropriate fraction so that various performances required depending on the application can be satisfied. In this case, a plurality of mineral oil-based and synthesized oil-based base oils may be used respectively.

Any of monosulfide compounds, disulfide compounds and polysulfide compounds can be used as the sulfide compound in the present embodiment, however, monosulfide compounds are preferable. Monosulfide compounds, for example, have a less activity than disulfide compounds and are preferable from the viewpoint of the stability of a refrigerating machine oil, the suppression of the degeneration of cupper widely used in a refrigerating machine, or the like.

Examples of the sulfide compound include diphenyl sulfide, dibenzyl sulfide, didecyl sulfide, didodecyl sulfide and thiobisphenol compounds, and thiobisphenol compounds, which are commonly known as antioxidants, have radical capturing ability and are also stabilizers, are preferable for the application of the present invention. As the thiobisphenol compound, a compound represented by the following formula (2) is preferably used.

[Chemical Formula 2]

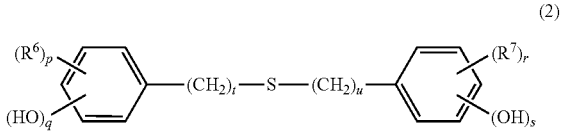

(2)

[$R^6$ and $R^7$ may be identical to or different from each other and each represents a hydrocarbon group; p, q, r and s may be identical to or different from each other and each represents an integer of 0 to 5 such that p+q and r+s are 0 to 5, with the proviso that at least one of q and s is 1 or more; and t and u may be identical to or different from each other and each represents an integer of 0 to 10.]

In the formula (2), $R^6$ and $R^7$ may be identical to or different from each other and each represents a hydrocarbon group, and p, q, r and s may be identical to or different from each other and each represents an integer of 0 to 5 such that p+q and r+s are 0 to 5. However, at least one of q and s is 1 or more and most preferably both of q and s are 1. Further, t and u may be identical to or different from each other and each represents an integer of 0 to 10. t and u are preferably 0 to 4, more preferably both of t and u are 0 or 1, and most preferably both of t and u are 0. A preferred hydrocarbon group is an alkyl group, cycloalkyl group and alkenyl group with 1 to 10 carbon atoms, preferably with 1 to 6 carbon atoms and phenyl group, and specific examples thereof include a methyl group, an ethyl group, an n-propyl group, an i-propyl group, an n-butyl group, a sec-butyl group and a tert-butyl group.

Preferred examples of the compound represented by the formula (2) specifically include 4,4'-thiobis (3-methyl-6-tert-butylphenol), 4,4'-thiobis(2,6-di-tert-butylphenol), 4,4'-thiobis (2-methyl-6-tert-butylphenol), 2,2'-thiobis (4-methyl-6-tert-butylphenol), 2,2'-thiobis (4,6-di-tert-butylphenol) and bis (3,5-di-tert-butyl-4-hydroxybenzyl)sulfide.

The content of the sulfide compound is 0.01 to 2.0% by mass, preferably 0.05 to 1.0% by mass, and more preferably 0.1 to 0.5% by mass based on the total amount of the refrigerating machine oil. If the content is below the above lower limit value, then the wear resistance-improving effect is insufficient, and if the content is over the above upper limit value, then corrosive wear may be caused on the contrary depending on the atmosphere.

Triphenyl phosphate (TPP), tricresyl phosphate (TCP) and alkylphenyl phosphates (APP) having a C3-C4 alkyl group (alkyl group with 3 to 4 carbon atoms) are preferable as the orthophosphoric acid ester in the present embodiment. TPP and TCP have a single structure and an APP is a mixture of one having one alkylphenyl group (mono-type), one having two alkylphenyl groups (di-type) and one having three alkylphenyl groups (tri-type), and the mixture ratio thereof is not particularly limited.

The content of the orthophosphoric acid ester is 0.1 to 5.0% by mass, preferably 0.1 to 3.0% by mass, and more preferably 0.2 to 2.0% by mass based on the total amount of the refrigerating machine oil. If the content is below the above lower limit value, the wear resistance-improving effect is insufficient, and if the content is over the above upper limit value, then the stability may be lowered.

In the present embodiment, the wear resistance of the working fluid can be dramatically improved by further blending pentaerythritol tetra(2-ethylhexanoate) in the refrigerating machine oil. Pentaerythritol tetra(2-ethylhexanoate) is an ester synthesized from pentaerythritol and 2-ethylhexanoic acid. It is preferable that it be a complete ester (also referred to as a "full ester") in which all of the hydroxyl groups in the pentaerythritol are esterified. It is preferable that the acid value of the ester be 0.1 mgKOH/g or less and the hydroxyl value thereof be 10 mgKOH/g or less, respectively. The amount of the above ester to be blended is preferably 2 to 20% by mass based on the total amount of the refrigerating machine oil, and more preferably 2 to 7% by mass, although the optimum amount to be blended varies depending on the type and viscosity of the base oil. A significant wear resistance-improving effect cannot be exerted in the cases of a large amount and a small amount to be blended, although the mechanism has not been revealed.

In the present embodiment, in order to further improve the performance, an additive conventionally used for a lubricating oil such as an antioxidant, a friction modifier, an antiwear agent, an extreme-pressure agent, a rust inhibitor, a metal deactivator and an antifoaming agent can be contained in the refrigerating machine oil within a range not impairing the object of the present invention.

Examples of the antioxidant include phenol compounds such as di-tert-butyl-p-cresol, and amine compounds such as an alkyldiphenylamine; examples of the friction modifier include aliphatic amines, aliphatic amides, aliphatic imides, alcohols and esters; examples of the antiwear agent include acidic phosphate amine salts, phosphite amine salts and zinc dialkyldithiophosphates; examples of the extreme-pressure agent include olefin sulfides and sulfurized oils and fats; examples of the rust inhibitor include alkenyl succinates or alkenyl succinic acid partial esters; examples of the metal deactivator include benzotriazole, thiadiazole and gallates; and examples of the antifoaming agent include silicone compounds and polyester compounds, respectively.

The kinematic viscosity of the refrigerating machine oil at 40° C. is 3 to 500 mm$^2$/s, preferably 3 to 300 mm$^2$/s, and more preferably 5 to 150 mm$^2$/s. By setting the kinematic viscosity in the above range, a sufficient wear resistance can be obtained and compatibility with a refrigerant can be enhanced.

The characteristics of the refrigerating machine oil other than the kinematic viscosity at 40° C. are not particularly limited, however, the viscosity index is preferably 10 or more. The pour point is preferably −10° C. or lower, and more preferably −20° C. or lower. The flash point is preferably 120° C. or higher, and more preferably 200° C. or higher.

In addition, the acid value of the refrigerating machine oil is not particularly limited, however, in order to prevent the corrosion of metals used in a refrigerating machine or a piping and suppress the deterioration of the refrigerating machine oil itself, the acid value can be preferably set to 0.1 mgKOH/g or less, and more preferably 0.05 mgKOH/g or less. Note that the acid value in the present invention means an acid value measured in accordance with HS K2501 "Petroleum products and lubricants-Determination of neutralization number".

The moisture content of the refrigerating machine oil is not particularly limited, however, it is preferably 200 ppm or less, more preferably 100 ppm or less, and most preferably 50 ppm or less. Particularly in the case that the refrigerating machine oil is used for a sealed-type refrigerating machine, the moisture content is required to be low from the viewpoint of the stability and electrical insulation properties of the refrigerating machine oil.

With regard to refrigerating machines, there is a trend that the current HFC refrigerant with a high GWP is replaced with a refrigerant with a low GWP from the viewpoint of preventing the global warming as described above, and a refrigerating machine oil applied thereto has been needed and a suitable working fluid in which a refrigerant and a refrigerating machine oil are mixed together is required.

Currently, 1,1,1,2-tetrafluoroethane (R134a) is widely used for refrigerators and car air conditioners, and R410A which is a mixed refrigerant of difluoromethane (R32) and pentafluoroethane (R125) in a mass ratio of 1/1 is widely used for room air conditioners. For the base oil of the refrigerating machine oil for these refrigerants, esters, polyethers, particularly polyol esters, polyalkylene glycols and polyvinyl ethers, which have a moderate mutual solubility (compatibility), are suitable.

In a refrigerant circulation cycle in a refrigerating/air conditioning machine, the refrigerating machine oil lubricating the compressor circulates in the cycle along with the refrigerant, and therefore the compatibility of the refrigerating machine oil with the refrigerant is required. If the refrigerating machine oil and the refrigerant are not compatible, the refrigerating machine oil discharged from the compressor is likely to remain in the cycle, and as a result the amount of the oil in the compressor is decreased to cause problems such as wear due to defective lubrication and the blockage of an expansion mechanism such as a capillary.

However, any of the above refrigerants has a high GWP of 1000 or more and therefore the use thereof is going to be regulated by the so-called F-gas Regulation. As an alternative therefor, hydrofluoroolefins (HFO) which are unsaturated hydrocarbons with a low GWP and difluoromethane (R32), or hydrocarbon refrigerants such as isobutane (R600a) and propane (R290), carbon dioxide (R744), and in addition mixed refrigerants containing them are studied and considered to be leading candidates.

Examples of the unsaturated hydrocarbon include 2,3,3,3-tetrafluoropropene (HFO-1234yf), 1,3,3,3-tetrafluoropropene (HFO-1234ze) and 1,2,3,3,3-pentafluoropropene (HFO-1225ye). These HFO refrigerants have an olefin structure subject to decomposition in the molecule, and therefore characterized in that they have a low stability, although having a low GWP. In particular, under conditions of a high loading, a local heat generation occurs at a sliding part of metal/metal contact to cause the decomposition of the refrigerant to be accelerated along with wear and hydrofluoric acid is generated, which may lead to the deterioration of the working fluid in which the refrigerant and the refrigerating machine oil are mutually dissolved and moreover may cause corrosive wear in relation to lubricity, and therefore the lubricity of the refrigerating machine oil is critical properties.

In the case of R32 which is a hydrofluorocarbon (HFC) having a low boiling point and a high pressure or a mixed refrigerant containing a large amount of R32, the discharge temperature of the compressor is increased to reduce the thickness of the oil film of the refrigerating machine oil, resulting in severe lubrication conditions. In the case of a hydrocarbon refrigerant, it has no fluorine in the hydrocarbon molecule, which contributes to the improvement of lubricity, and has a high solubility in the refrigerating machine oil, which lowers the viscosity of the refrigerating machine oil, resulting in severe lubrication conditions. As described above, any of the refrigerant candidates having a low GWP causes severe conditions in view of lubricity, and therefore the refrigerating machine oil to be used is required to have a high lubricity.

The refrigerant in the present embodiment is not particularly limited as long as the GWP thereof is 700 or less, however, a refrigerant which dissolves mutually, that is, a refrigerant which dissolves mutually without being separated into two layers at a normal temperature is preferable. In particular, a refrigerant containing one or more selected from a hydrofluorocarbon (HFC), a hydrofluoroolefin (HFO), carbon dioxide (R744) and a hydrocarbon with 2 to 4 carbon atoms is more preferable, and a refrigerant containing difluoromethane (R32) and/or 2,3,3,3-tetrafuoropropene (HFO-1234yf) is the most preferable.

In the working fluid composition for a refrigerating machine according to the present embodiment, the blending ratio of the refrigerating machine oil/refrigerant is not particularly limited, however, the blending ratio is usually 1 to 1000 parts by weight, and preferably 2 to 800 parts by weight based on 100 parts by weight of the refrigerant.

EXAMPLES

Hereinafter, the present invention will be specifically described on the basis of Examples and Comparative Examples, however, the present invention is never limited to the following Examples.

Examples 1 to 12, Comparative Examples 1 to 12

In Examples 1 to 12 and Comparative Examples 1 to 12, refrigerating machine oils having the compositions shown in Tables 1 to 3 were prepared using the base oils and additives shown in the following. Note that the content of the base oil and the additive shown in Tables 1 to 3 is a content based on the total amount of the refrigerating machine oil.

[Base Oil]

(A-1) Polyol ester (POE-1): an ester of pentaerythritol and a mixed acid of 2-methylpropanoic acid and 3,5,5-trimethylhexanoic acid in a mass ratio of 35:65 (kinematic viscosity: 68.1 mm$^2$/s at 40° C.; viscosity index: 84; pour point: −40° C.; flash point: 240° C.; carbon/oxygen molar ratio: 3.6)

(A-2) Polyol ester (POE-2): an ester of pentaerythritol and a mixed acid of 2-ethylhexanoic acid and 3,5,5-trimethylhexanoic acid in a mass ratio of 5:5 (kinematic viscosity: 66.7 mm$^2$/s at 40° C.; viscosity index: 92; pour point: −40° C.; flash point: 248° C.; carbon/oxygen molar ratio: 4.8)

(A-3) Polyalkylene glycol (PAG): a polyoxypropylene in which the both ends are each blocked with a methyl group (average molecular weight: 1000; kinematic viscosity: 46.0 mm$^2$/s at 40° C.; viscosity index: 190; pour point: −45° C.; flash point: 218° C.; carbon/oxygen molar ratio: 3.0)

(A-4) Polyvinyl ether (PVE): a copolymer of ethyl vinyl ether and isobutyl vinyl ether (ethyl vinyl ether:isobutyl vinyl ether is 7:1 in a weight ratio), (average molecular weight: 910; kinematic viscosity: 66.4 mm$^2$/s at 40° C.; viscosity index: 85; pour point: −35° C.; flash point: 210° C.; carbon/oxygen molar ratio: 4.3)

(A-5) Mineral oil-based base oil (MO): paraffin-based refined mineral oil (kinematic viscosity: 22.3 mm$^2$/s at 40° C.; viscosity index: 95; pour point: −15° C.; flash point: 200° C.)

Note that the kinematic viscosity and the viscosity index were measured in accordance with JIS K2283, the pour point was measured in accordance with JIS K2269, and the flashing point was measured in accordance with JIS K2265.

[Sulfide Compound]

(S-1) Dibenzyl sulfide
(S-2) Didodecyl sulfide
(S-3) 4,4'-thiobis (3-methyl-6-tert-butylphenol)

[Orthophosphoric Acid Ester]

(P-1) Tricresyl phosphate (TCP)
(P-2) Triphenyl phosphate (TPP)
(P-3) Tridecyl phosphate (TDP)

[Other Material]

(D-1) Pentaerythritol tetra(2-ethylhexanoate) (an ester of pentaerythritol and 2-ethylhexanoic acid; acid value: 0.01 mgKOH/g; hydroxyl value: 1.2 mgKOH/g)

Next, the refrigerating machine oils in Examples 1 to 12 and Comparative Examples 1 to 12 were subjected to the following lubricity test and stability test in combination with the various refrigerants shown in Tables 1 to 3. Note that "1234yf" in Tables 1 to 3 means HFO-1234yf.

(Lubricity Test)

The lubricity test was in accordance with ASTM D3233-73 and the wear test was carried out with a Falex (pin/V-block) test machine at a constant loading.

In the Falex wear test, a running-in was performed for 5 min at an initial temperature of 50° C., a rotational frequency of 290 rpm and a loading of 50 Lbf under an atmosphere with the blowing of the refrigerant controlled (70 ml/min), and thereafter the final test was performed for 1 h at the same rotational frequency and a loading of 100 Lbf to measure the total value (mg) of the amounts of wear for the pin and the V-block after the test.

R32, HFO-1234yf and R600a (isobutane) were used as the refrigerant to be blown.

(Stability Test)

The stability test was in accordance with JIS K2211-09 (autoclave test), in which 90 g of a sample oil whose moisture content was adjusted to 100 ppm was weighed in a autoclave, and catalysts (wires made of iron, copper, and aluminum, respectively, outer diameter 1.6 mm×50 mm for any of them) and 10 g of each refrigerant (R32, HFO-1234yf, R600a) were sealed in, and thereafter heated to 175° C. and the appearance and acid value (JIS C2101) of the sample oil after 100 h were measured.

The acid values of sample oils before the stability test (new oil) were all 0.01 mgKOH/g.

TABLE 1

|  | Example 1 | Example 2 | Example 3 | Example 4 | Example 5 | Example 6 | Example 7 | Example 8 |
|---|---|---|---|---|---|---|---|---|
| <Base oil> | | | | | | | | |
| Type | A-1 | A-1 | A-1 | A-2 | A-2 | A-2 | A-3 | A-4 |
| Content (% by mass) | 98.8 | 98.8 | 98.8 | 95.8 | 98.8 | 98.8 | 98.8 | 98.8 |
| <Additive> (% by mass) | | | | | | | | |
| S-1 | 0.2 | — | — | — | 0.2 | — | — | — |
| S-2 | — | — | 0.2 | — | — | — | 0.2 | — |
| S-3 | — | 0.2 | — | 0.2 | — | 0.2 | — | 0.2 |
| P-1 | 1.0 | 1.0 | — | 1.0 | — | — | — | 1.0 |
| P-2 | — | — | 1.0 | — | 1.0 | 1.0 | — | — |
| P-3 | — | — | — | — | — | — | 1.0 | — |
| D-1 | — | — | — | 3.0 | — | — | — | — |
| Kinematic viscosity at 40° C. of refrigerating machine oil (mm$^2$/s) | 68.0 | 68.0 | 68.2 | 65.8 | 66.6 | 66.6 | 66.8 | 66.6 |
| <Lubricity test> | | | | | | | | |
| Refrigerant | R32 | R32 | R32 | R32 | 1234Yf | R600a | R32 | R32 |
| Amount of wear (mg) | 3.2 | 3.0 | 3.3 | 1.8 | 3.6 | 3.2 | 3.5 | 2.7 |
| <Heat stability test> | | | | | | | | |
| Refrigerant | R32 | R32 | R32 | R32 | 1234Yf | R600a | R32 | R32 |
| Appearance | No precipitation | No precipitation | No precipitation | No precipitation | No precipitation | No precipitation | No precipitation | No precipitation |
| Acid value (mgKOH/g) | 0.01 | 0.01 | 0.01 | 0.01 | 0.03 | 0.01 | 0.01 | 0.01 |

TABLE 2

|  | Example 9 | Example 10 | Example 11 | Example 12 | Comparative Example 1 | Comparative Example 2 | Comparative Example 3 | Comparative Example 4 |
|---|---|---|---|---|---|---|---|---|
| <Base oil> | | | | | | | | |
| Type | A-5 | A-3 | A-4 | A-5 | A-1 | A-3 | A-1 | A-1 |
| Content (% by mass) | 98.8 | 98.8 | 98.8 | 98.8 | 100 | 100 | 98.8 | 98.0 |
| <Additive> (% by mass) | | | | | | | | |
| S-1 | 0.2 | — | 0.2 | 0.2 | — | — | — | — |
| S-2 | — | — | — | — | — | — | — | — |
| S-3 | — | 0.2 | — | — | — | — | — | — |
| P-1 | — | — | — | — | — | — | 1.2 | 2.0 |
| P-2 | 1.0 | 1.0 | 1.0 | — | — | — | — | — |
| P-3 | — | — | — | 1.0 | — | — | — | — |
| D-1 | — | — | — | — | — | — | — | — |
| Kinematic viscosity at 40° C. of refrigerating machine oil (mm$^2$/s) | 22.5 | 46.0 | 66.4 | 22.3 | 68.1 | 46.0 | 68.0 | 68.0 |
| <Lubricity test> | | | | | | | | |
| Refrigerant | R600a | 1234Yf | 1234Yf | R600a | R32 | 1234Yf | R32 | R32 |
| Amount of wear (mg) | 2.7 | 3.9 | 2.6 | 2.8 | 12.3 | 14.5 | 8.6 | 7.6 |
| <Heat stability test> | | | | | | | | |
| Refrigerant | R600a | 1234yf | 1234yf | R600a | R32 | 1234yf | R32 | R32 |
| Appearance | No precipitation | No precipitation | No precipitation | No precipitation | No precipitation | No precipitation | No precipitation | No precipitation |
| Acid value (mgKOH/g) | 0.01 | 0.03 | 0.03 | 0.01 | 0.01 | 0.03 | 0.01 | 0.01 |

TABLE 3

| | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|
| <Base oil> | | | | | | | | |
| Type | A-2 | A-3 | A-4 | A-5 | A-1 | A-1 | A-2 | A-2 |
| Content (% by mass) | 98.8 | 98.8 | 98.8 | 98.8 | 99.8 | 98.8 | 98.8 | 73.8 |
| <Additive> (% by mass) | | | | | | | | |
| S-1 | — | — | — | — | 0.2 | 1.2 | — | — |
| S-2 | — | — | — | — | — | — | 1.2 | — |
| S-3 | — | — | — | — | — | — | — | 1.2 |
| P-1 | 1.2 | — | — | — | — | — | — | — |
| P-2 | — | 1.2 | 1.2 | — | — | — | ^ | — |
| P-3 | — | — | — | 1.2 | — | — | — | — |
| D-1 | — | — | — | — | — | — | — | 25.0 |
| Kinematic viscosity at 40° C. of refrigerating machine oil (mm²/s) | 66.6 | 46.2 | 66.2 | 22.4 | 68.2 | 68.2 | 66.7 | 60.9 |
| <Lubricity test> | | | | | | | | |
| Refrigerant | R32 | 1234yf | R32 | R600a | R32 | R32 | R32 | R32 |
| Amount of wear (mg) | 8.0 | 9.0 | 7.8 | 7.6 | 9.5 | 8.7 | 8.8 | 8.4 |
| <Heat stability test> | | | | | | | | |
| Refrigerant | R32 | 1234yf | R32 | R600a | R32 | R32 | R32 | R32 |
| Appearance | No precipitation | No precipitation | No precipitation | No precipitation | No precipitation | No precipitation | No precipitation | No precipitation |
| Acid value (mgKOH/g) | 0.01 | 0.03 | 0.01 | 0.01 | 0.01 | 0.01 | 0.01 | 0.01 |

As seen from Tables 1 to 3, even though the slight increase of the acid value was found in the combinations with HFO-1234yf, Examples 1 to 12 and Comparative Examples 1 to 12 were non-problematic with regard to the stability.

With regard to lubricity, the amount of wear is small in all of Examples 1 to 12, indicating a good wear resistance. On the other hand, it can be seen that the amount of wear is considerably large in Comparative Examples 1 and 2, and even though the amount of wear in Comparative Examples 3 to 12 is less than that in Comparative Example 1 or 2, Comparative Examples 3 to 12 are further inferior to Examples in the antiwear effect even when the amount of the additive to be blended is larger than that in Examples.

Further, by comparing Example 4 with Example 1 and Comparative Examples 5 and 12, it can be seen that a remarkable wear resistance effect can be obtained by appropriately blending (D-1).

INDUSTRIAL APPLICABILITY

The working fluid composition for refrigerating/air conditioning according to the present invention is a working fluid excellent in long-term reliability which can maintain the antiwear effect even under severe lubrication conditions, and therefore can be suitably used for a refrigerating/air conditioning system with a high cooling efficiency which has a compressor, a condenser, a throttle device, an evaporator or the like and circulates a refrigerant through them, in particular a system having a compressor such as a rotary type, swing type and scroll type compressor, and can be used in the field of room air conditioners, package air conditioners, refrigerators, car air conditioners, industrial refrigerating machines or the like.

The invention claimed is:
1. A refrigerating machine oil comprising:
    a base oil comprising a polyol ester obtainable by synthesis from
        a polyhydric alcohol comprising pentaerythritol and
        a fatty acid comprising isobutanoic acid and 3,5,5-trimethylhexanoic acid;
    a sulfide compound comprising at least one selected from the group consisting of diphenyl sulfide, dibenzyl sulfide, didecyl sulfide, didodecyl sulfide and thiobisphenol compounds; and
    an orthophosphoric acid ester comprising at least one selected from the group consisting of triphenyl phosphate, tricresyl phosphate, and an alkylphenyl phosphate having a C3-C4 alkyl group,
    wherein
    a content of the sulfide compound is 0.1 to 0.5% by mass and
    a content of the orthophosphoric acid ester is 0.2 to 2.0% by mass, based on a total amount of the refrigerating machine oil, and
    the refrigerating machine oil having a kinematic viscosity at 40° C. of 5 to 150 mm²/s.
2. A working fluid composition for a refrigerating machine comprising:
    a refrigerant; and
    the refrigerating machine oil according to claim 1.
3. The working fluid composition according to claim 2, wherein the refrigerant comprises at least one selected from the group consisting of difluoromethane, HFO-1234yf and R600a.
4. The working fluid composition according to claim 2, wherein the refrigerant has a global warming potential of 700 or less.
5. The working fluid composition according to claim 4, wherein the refrigerant comprises difluoromethane.

6. The working fluid composition according to claim 4, wherein the refrigerant comprises HFO-1234yf.

7. The working fluid composition according to claim 4, wherein the refrigerant comprises R600a.

* * * * *